United States Patent
Hong et al.

(10) Patent No.: US 8,211,966 B2
(45) Date of Patent: Jul. 3, 2012

(54) ECO-FRIENDLY POLYPROPYLENE-POLYLACTIC ACID COMPOSITE COMPOSITION

(75) Inventors: Chae Hwan Hong, Gyeonggi-do (KR); Do Suck Han, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 192 days.

(21) Appl. No.: 12/853,428

(22) Filed: Aug. 10, 2010

(65) Prior Publication Data
US 2011/0257323 A1 Oct. 20, 2011

(30) Foreign Application Priority Data
Apr. 20, 2010 (KR) .................. 10-2010-0036558

(51) Int. Cl.
*C08K 3/34* (2006.01)
*C08L 23/12* (2006.01)
(52) U.S. Cl. .................. 524/451; 524/504; 524/64
(58) Field of Classification Search .................. 524/451, 524/504; 525/64
See application file for complete search history.

(56) References Cited

U.S. PATENT DOCUMENTS
2008/0076880 A1* 3/2008 Nakagawa et al. .......... 525/190

FOREIGN PATENT DOCUMENTS
| JP | 2008-081585 A | 4/2008 |
| JP | 2009-096892 A | 5/2009 |
| JP | 2009-256487 A | 11/2009 |
| KR | 10-2009-0034199 | 4/2009 |

* cited by examiner

*Primary Examiner* — Vickey Nerangis
(74) *Attorney, Agent, or Firm* — Edwards Wildman Palmer LLP; Peter F. Corless

(57) ABSTRACT

The present invention relates to a polypropylene-polylactic acid composite composition comprising a mixture of polypropylene resin and polylactic acid resin, wherein ethylene-octene copolymer grafted by anhyrdrous maleic acid, polylactic acid resin grafted by anhydrous maleic acid, polyethylene-glycidyl methacrylate resin and talc particles are added thereto. The composition reduces $CO_2$ emission and improve mechanical strength and heat resistance, thereby being suitable as a material for the interior and exterior parts of a vehicle as well as construction.

8 Claims, 1 Drawing Sheet

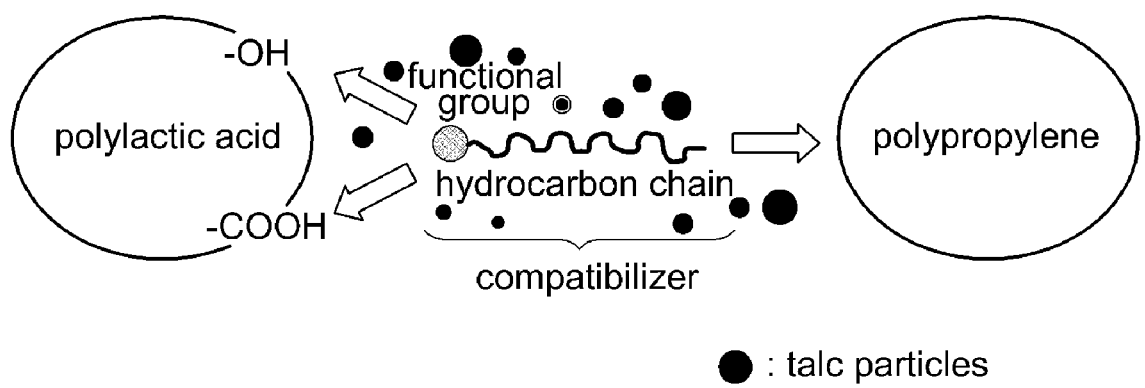

ECO-FRIENDLY POLYPROPYLENE-POLYLACTIC ACID COMPOSITE COMPOSITION

CROSS-REFERENCE TO RELATED APPLICATION

This application claims under 35 U.S.C. §119(a) the benefit of Korean Patent Application No. 10-2010-0036558 filed Apr. 20, 2010, the entire contents of which are incorporated herein by reference.

BACKGROUND (a) Technical Field

The present disclosure relates to a polypropylene-polylactic acid composite composition. More particularly, it relates to a polypropylene-polylactic acid composite composition with excellent heat resistance and mechanical strength thus being useful in the manufacture of vehicle parts materials as well as construction materials.

(b) Background Art

The rapid global industrialization since the late 20th century appears to be largely due to fossil fuel resources, in particular, petroleum resource. The effort toward full-fledged industrialization has been boosting up the use of petroleum along with the global increase in population. However, petroleum is not a recyclable resource and also its global reservoir appears to be very limited. Further, as petroleum produces carbon dioxide, which has been claimed as a main cause of global warming, there have been many lines of research working on how to reduce carbon dioxide emission and avoid use of petroleum.

Plant-derived biomass polymers can be obtained from recyclable plant resources such as corns, beans, sugar cane, woods or the like by means of chemical or biological means. They appear to be more effective than biodegradable materials in coping with environmental issues including carbon dioxide reduction. Of the biomass polymers, polylactic acid is a linear aliphatic polyester which can be prepared by fermentation of starch of corn or potato, or by polymerization of sugar monomers obtained by fermentation of saccharified plant cellulose. It is a carbon neutral eco-friendly thermoplastic polymer.

However, polylactic acid resin has poor physical properties as compared to those of conventional polymer materials and thus its industrial application is much limited. More particularly, in order for polylactic acid to be used as automotive materials, it is essential to remedy its heat resistance and impact resistance. For this reason, there have been many attempts to develop composite materials by blending it with polypropylene resin, a conventional petroleum-based resin.

Polypropylene resin, however, is not compatible with polylactic acid resin due to difference in polarity between the two, methods of adding a compatibilizer have been attempted. For example, Japanese Patent Application Publication Nos. 2009-096892 and 2009-256487 disclose methods of adding noncrystalline polypropylene grafted by anhyrdrous maleic acid as a compatibilizer to improve the compatibility between polylactic acid resin and polypropylene resin. The compositions taught by the references were shown to have excellent impact strength but their tensile property was poor.

Japanese Patent Application Publication No. 2008-111043 teaches a method using ethylene-propylene copolymer grafted by anhyrdrous maleic acid as a compatibilizer. The composite material taught by the reference reveals that it has a good heat resistance but its impact strength is not good enough to be used for the manufacture of automotive materials. The reference also discloses a method of using amino-modified elastomer as a compatibilizer to obtain a composition having excellent properties in both heat resistance and impact strength. However, the resultant did not have sufficient property to be used as a material for interior and exterior parts of a vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In an effort to solve the above-described problems associated with prior art, the inventors of the present invention discovered that a composite composition wherein ethylene-octene copolymer resin grafted by anhydrous maleic acid and polylactic acid resin grafted by anhydrous maleic acid are added as compatibilizer to improve the compatibility between polypropylene resin and polylactic acid resin, wherein polyethylene glycidyl methacrylate (EGMA)) is added to improve the mechanical properties including heat resistance and impact strength of the polylactic acid material, and talc particles are added to improve the same.

In an aspect, the present invention provides a composition prepared by blending polylactic acid resin, a biomaterial capable of reducing carbon dioxide emission with polypropylene resin, a material widely used for the manufacture of interior and exterior of a vehicle, thereby rendering excellent heat resistance and mechanical strength on the composition while contributing to the reduction of the use of petroleum-based materials.

The present invention relates to an eco-friendly polypropylene-polylactic acid composite composition for the manufacture of a material of interior and exterior parts of a vehicle comprising polypropylene resin, polylactic acid resin, ethylene-octene copolymer resin grafted by anhydrous maleic acid, polylactic acid resin grafted by anhydrous maleic acid, talc particles, and polyethylene glycidyl methacrylate (EGMA).

Because the polypropylene-polylactic acid composite composition of the present invention comprises up to 30 wt. % of polylactic acid as a biomaterial, it can be recycled after use and can suitably comply to the 'low carbon green growth'. Further, due to its excellent heat resistance mechanical strength such as impact strength, it can be used as a material for the manufacture of interior and exterior parts of a vehicle as well as those for construction.

The above and other features and advantages of the present invention will be apparent from or are set forth in more detail in the accompanying drawings, which are incorporated in and form a part of this specification, and the following Detailed Description, which together serve to explain by way of example the principles of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated in the accompanying drawing which are given hereinbelow by way of illustration only, and thus are not limitative of the present invention, and wherein:

FIG. 1 is a diagram showing the principle of compatibilization between polypropylene resin and polylactic acid resin.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a polypropylene-polylactic acid composite composition comprising polypropylene resin, polylactic acid resin, ethylene-octene copolymer resin grafted by anhydrous maleic acid, polylactic acid resin grafted by anhydrous maleic acid, polyethylene glycidyl methacrylate (EGMA)), and talc particles.

The polypropylene resin is a widely used plastic resin, which is manufactured from cheap and abundant raw materials using a simple process. It is light-weighted due to a low specific gravity, strong, has low heat conductivity, dose not absorb water, and has excellent elasticity, drug resistance, processability, or the like. Further, since it is a recyclable thermoplastic resin, its use has been on the increase.

The polypropylene resin to be used in the present invention can be selected from the group consisting of propylene homopolymer, propylene random copolymer and propylene block copolymer. The polypropylene resin preferably has a melt index (MI) of 0.5-30 g/10 min (ASTM D 1238, 230° C.), more preferably 1.5-20 g/10 min. If the melt index is too low, it may deteriorate the processability of the composite material due to high melt viscosity. On the other hand, if the melt index is too high, it may result in poor mechanical strength.

The polypropylene resin is preferably used in the amount of 55-60 wt. % relative to 100 wt. % of the total composite composition. If it is used less than 55 wt. %, the content of the polypropylene resin to be used as a main material for matrix is not sufficient and thus it may reduce its mechanical strength. Meanwhile, if it is used more than 60 wt. %, it may lower the content of polylactic acid to be used, which is contrary to maximization of biomass aimed in the present invention. Therefore, it is preferred that the above range be maintained.

The above-mentioned polylactic acid resin can be manufactured by polymerization of monomeric lactic acid. Lactic acid is present in the form of L-type or D-type depending on optical activity. In general, lactic acid can be synthesized by a chemical method using a fossil resource such as coal, petroleum, natural gas, or by fermentation of plant carbohydrates such as corn starch, potato starch, molasse. In the chemical synthesis of lactic acid, lactic acid is produced in the form of a racemic mixture comprising 50 wt. % of L-type and D-type of lactic acid, respectively. In contrast, in the synthesis of lactic acid by fermentation, more than 99.5 wt. % of lactic acid produced is in L-type. Therefore, synthesis of lactic acid by fermentation of plant resources is preferred.

It is preferred that 100% natural resources, synthesized from biomass, be used which have a molecular weight in the range of 100,000-150,000 g/mol. If the molecular weight is below 100,000 g/mol, it may result in deterioration of mechanical strength of the lactic acid produced. Meanwhile, if the molecular weight is above 150,000 g/mol, it may lead to an excessive increase in melt viscosity thus making it difficult to obtain a ununiform dispersion of polylactic acid in polypropylene matrix.

The amount of lactic acid to be added is preferably in the range of 25-30 wt. %. If the amount to be used is less than 25 wt. %, it may vanish the meaning of an eco-friendly biomass material over the conventional petroleum-based material, and it may also deteriorate the mechanical strength of the lactic acid due to the decrease in the amount to bind to ethylene-octene copolymer grafted by anhyrdrous maleic acid, a compatibilizer. Meanwhile, if it is used more than 30 wt. %, it may lead to a relative decrease in the content of polypropylene resin thus deteriorating the mechanical strength of the polylactic acid.

The above-mentioned ethylene-octene copolymer resin grafted by anhydrous maleic acid and polylactic acid resin grafted by anhydrous maleic acid differ greatly in their polarity, and thus they can be used as a compatabilizer between polypropylene resin and polylactic acid resin, which are not compatible, thereby serving a dual function as a dispersant which makes polylactic acid resin particles dispersed in polypropylene resin uniform as well as a crosslinking agent which induces the interfacial interaction between polypropylene resin and polylactic acid resin to improve mechanical strength.

The ethylene-octene copolymer grafted by anhyrdrous maleic acid, preferably, has a graft rate of anhyrdrous maleic in the range of 0.5-1.0 wt. %. If the graft rate is below 0.5 wt. %, it may result in low polarity thus making it difficult to obtain a uniform dispersion of polylactic acid resin. If it exceeds 1.0 wt. %, on the other hand, it may lead to an excessive increase in melt viscosity thus lowering dispersion of the polylactic acid resin. Therefore, it is preferred that the above range be maintained.

The ethylene-octene copolymer grafted by anhyrdrous maleic acid is preferably used in the range of 1-5 wt. % relative to 100 wt. % of the total composition. If it is used less than 1 wt. %, the uniform dispersion of polylactic acid resin may not be obtained thus deteriorating the impact strength of the composition and making it difficult to be industrially applied. Meanwhile, if it is used more than 5 wt. %, the mechanical strength of the total final composite composition may not be improved. Therefore, it is preferred that the above range be maintained.

The polylactic acid resin grafted by anhydrous maleic acid copolymer, preferably, has a graft rate of anhyrdrous maleic in the range of 0.3-0.7 wt. %. If the graft rate is below 0.3 wt. %, it may result in low polarity thus making it difficult to obtain a uniform dispersion of polylactic acid resin. If it exceeds 0.7 wt. %, on the other hand, it may lead to an excessive increase in melt viscosity thus lowering dispersion of the polylactic acid resin. Therefore, it is preferred that the above range be maintained.

The polylactic acid resin grafted by anhydrous maleic acid copolymer is preferably used in the range of 1-5 wt. % relative to 100 wt. % of the total composition. If the graft rate is below 1 wt. %, it may result in low polarity thus making it difficult to obtain a uniform dispersion of polylactic acid resin. If it exceeds 5 wt. %, it may lead to excessive increase in melt viscosity thus lowering dispersion of the polylactic acid resin. Therefore, it is preferred that the above range be maintained.

The polylactic acid resin grafted by anhydrous maleic acid copolymer is preferably used in the range of 1-5 wt. % relative to 100 wt. % of the total composition. If it is used less than 1 wt. %, the uniform dispersion of polylactic acid resin may not be obtained thus deteriorating the impact strength of the composition and making it difficult to be industrially applied. Meanwhile, if it is used more than 5 wt. %, the mechanical strength of the total composite composition may not be improved. Therefore, it is preferred that the above range be maintained.

The polyethylene-glycidyl methacrylate resin is preferably used in the range of 1-5 wt. % relative to 100 wt. % of the total composition. If it is used less than 1 wt. %, it may decrease the chemical reactivity of the total composite composition with polylactic acid and thus the uniform dispersion of polylactic acid resin may not be obtained thereby deteriorating the impact strength of the composition and making its industrial application difficult. Meanwhile, if it is used more than 5 wt. %, it may result in excessive chemical bond with polylactic acid thus the mechanical strength of the total composite composition may not be improved. Therefore, it is preferred that the above range be maintained.

Further, the polyethylene-glycidyl methacrylate resin preferably contains glycidyl methacrylate in the range of 5-8 wt. % within polyethylene-glycidyl methacrylate. If its content is less than 5 wt. %, it may result in decrease in the chemical reactivity of the total composite composition with polylactic acid and thus the uniform dispersion of polylactic acid resin may not be obtained. On the other hand, if its content exceeds 8 wt. %, it may result in excessive chemical bond with polylactic acid thus the mechanical strength of the total composite composition may not be improved. Therefore, it is preferred that the above range be maintained.

Talc particles are flat-shaped inorganic mineral which chemically belong to magnesium silicate hydrate. The talc particles used in the present invention are preferably those which are used as a strength reinforcing agent of a thermoplastic material. The amount of talc particles used are preferably in the range of 5-10 wt. % relative to 100 wt. % of the total composition. If it is used less than 5 wt. %, it may not be sufficient to improve strength of the final composition and thus its industrial application may be more difficult. Meanwhile, if it is used more than 10 wt. %, it may lead to excessive increase of mechanical strength thus resulting in deterioration of impact strength. Therefore, it is preferred that the above range be maintained.

The polypropylene-polylactic acid composite composition of the present invention may be formed into a material for interior/exterior parts of a vehicle or for construction by the following methods.

First, 55-60 wt. % of polypropylene resin, 25-30 wt. % of polylactic acid resin, 1-5 wt. % of ethylene-octene copolymer grafted by anhyrdrous maleic acid, 1-5 wt. % of polylactic acid resin grafted by anhydrous maleic acid, 1-5 wt. % of polypethylene-glycidyl methacrylate resin, 5-10 wt. % of talc particles, all relative to the total composition, are completely mixed by using a mixing machine such as a blending machine or a hopper. The above mixture is then melt-extruded by using an extruder and then formed into a pellet. The melt extruded pellet is heated at 200-220° C. Here, the polylactic acid resin is dispersed into melted into polypropylene resin and ethylene-octene copolymer grafted by anhyrdrous maleic acid. The resultant is then formed into a desired product by means of injection molding in a mold kept at 30-50° C.

The polypropylene-polylactic acid composite composition of the present invention contains up to 30 wt. % of polylactic acid as a biomass and is recyclable after use. It has also excellent heat resistance, and mechanical strength including impact strength and thus can be suitably used as a material for the manufacture of parts for interior and exterior parts of a vehicle including dash outer, dash inner, food silence, door pad, door trim, headliner, package tray, trunk mat as well as those for construction.

EXAMPLES

The following examples illustrate the invention and are not intended to limit the same.

Examples 1-2

Polypropylene random copolymer resin [R724J, GS-Caltex Corporation], polylactic acid resin [Nature WorksLLC]. ethylene-octene copolymer resin grafted by anhydrous maleic acid [Aldrich Chemical Company], polylactic acid resin grafted by anhydrous maleic acid, and polyethylene-glycidyl methacrylate resin [Aldrich Chemical Company], talc particles [KC-3000, KOCH, Co., Ltd.] were mixed by means of roll mixing milling in a dry state according to the composition shown in Table 1 below, added into a twin screw extruder and melt-mixed at 210° C., higher than the melting point of polypropylene random copolymer and other resins disclosed herein, and finally obtained the composite compositions. The physical properties and heat resistance of thus prepared composite compositions were measured according to test examples and the results are shown in Table 2 below.

Comparative Examples 1-4

Experiments were conducted in the same way as in Example 2, except that ethylene-octene copolymer resin grafted by anhydrous maleic acid was replaced respectively with noncrystalline polypropylene resin grafted by anhydrous maleic acid (comparative example 1); with crystalline polypropylene resin grafted by anhyrdrous maleic acid (comparative example 2); with ethylene-propylene copolymer resin grafted by anhyrdrous maleic acid (comparative example 3); and with amino modified styrene-ethylene butylenes-styrene block copolymer resin (comparative example 4), wherein the wt. % are shown in Table 1. The physical properties and heat resistance of thus prepared composite compositions were measured according to test examples and the results are shown in Table 2 below.

TABLE 1

| Category | Examples (wt. %) | | Comparative Examples (wt. %) | | | |
| --- | --- | --- | --- | --- | --- | --- |
| | 1 | 2 | 1 | 2 | 3 | 4 |
| A | 55 | 60 | 70 | 70 | 70 | 70 |
| B | 25 | 25 | 25 | 25 | 25 | 25 |
| C-1 | 5 | 5 | — | — | — | — |
| C-2 | — | — | 5 | — | — | — |
| C-3 | — | — | — | 5 | — | — |
| C-4 | — | — | — | — | 5 | — |
| C-5 | — | — | — | — | — | 5 |
| D | 5 | 4 | — | — | — | — |

TABLE 1-continued

| Category | Examples (wt. %) | | Comparative Examples (wt. %) | | | |
|---|---|---|---|---|---|---|
| | 1 | 2 | 1 | 2 | 3 | 4 |
| E | 5 | 1 | — | — | — | — |
| F | 5 | 5 | — | — | — | — |

A: polypropylene random copolymer resin[R724J, GS-Caltex Corporation]
B: polylactic acid resin [Nature WorksLLC]
C-1: ethylene-octene copolymer resin grafted by anhyrdrous maleic acid (Aldrich Chemical Company, Inc.)
C-2: noncrystalline polypropylene resin grafted by anhyrdrous maleic acid [T4535MA, Sumitomo Chem]
C-3: crystalline polypropylene resin grafted by anhyrdrous maleic acid [Umex 1010, Sanyo Chem]
C-4: ethylene-propylene copolymer resin grafted by anhyrdrous maleic acid[MP0620, Mitsui Chem]
C-5: amino modified styrene-ethylene-butylenes-styrene block copolymer resin [Dynaron 8630P, JSR Corporation]
D: polylactic acid resin grafted by anhyrdrous maleic acid [self-synthesis]
E: polyethylene-glycidyl methacrylate resin [Aldrich Chemical Company, Inc.]
F: Talc [KOCH Korea, KC-3000]

TEST EXAMPLES

Test Examples Measurement of Physical Properties

In order to measure the mechanical strength if the composite compositions prepared in the above Examples 1-2, and Comparative Examples 1-4, specimens were prepared by means of injection molding according to the methods (ASTM D 638, ASTM D 256, ASTM D 790, ASTM D 648) shown below. The results are shown in Table 2 below. The specimens for the measurement of tensile property were prepared in the form of a dumbbell and those for the measurement of Izod impact strength were prepared to have a notch thereon.

1. Measurement of Tensile Strength

Specimens were prepared according to ASTM D 638 (Standard Test Method for Tensile Properties of Plastics), and tensile strength, elongation, and tensile modulus were measured by using a universal testing machine (UTM).

2. Measurement of Izod Impact Strength

Specimens were prepared according to ASTM D 256 (Standard Test Methods for Determining the Izod Pendulum Impact Resistance of Plastics), and impact strength was measured by using Izod Impact Tester.

3. Measurement of Flexural Modulus

Specimens were prepared according to ASTM D 790 (Standard Test Methods for Flexural Properties of Unreinforced and Reinforced Plastics and Electrical Insulating Materials), and flexural modulus was measured by using a universal testing machine (UTM).

4. Measurement of Heat Resistance

Specimens were prepared according to ASTM D 648 (Standard Test Method for Deflection Temperature of Plastics Under Flexural Load in the Edgewise Position), and heat resistance was measured by using a universal testing machine (UTM).

TABLE 2

| Category | Examples | | Comparative Examples | | | |
|---|---|---|---|---|---|---|
| | 1 | 2 | 1 | 2 | | |
| Tensile Strength (kg/cm$^2$) | 291 | 290 | 150 | 130 | 120 | 130 |
| Elongation(%) | 590 | 550 | 150 | 183 | 190 | 170 |
| Tensile Modulus(MPa) | 1600 | 1550 | 560 | 580 | 570 | 550 |
| Impact Strength (kJ/m$^2$) | 19 | 20 | 17 | 6 | 5 | 4 |
| Flexural Modulus (kg/cm$^2$) | 13000 | 13100 | 8000 | 8200 | 11900 | 9100 |
| Heat Resistance (□) | 120 | 121 | 90 | 92 | 115 | 90 |

As shown in the above Table 2, in Comparative Example 1, wherein noncrystalline polypropylene resin grafted by anhyrdrous maleic acid was used as a compatibilizer, the composite composition had good impact strength but a poor tensile property. In Comparative Example 3, wherein ethylene-propylene copolymer resin grafted by anhyrdrous maleic acid was used as a compatibilizer, the composite composition had excellent heat resistance and flexural modulus but the impact strength and tensile property were not sufficient to be used for the manufacture of interior and exterior parts of a vehicle. Further, the composite composition of the present invention, wherein ethylene-octene copolymer resin grafted by anhydrous maleic acid was used as a compatibilizer, showed superiorities in overall mechanical strength and heat resistance to those in Comparative Example 4, wherein amino-modified elastomer was used as a compatibilizer.

In conclusion, the polypropylene-polylactic acid composite composition of the present invention was confirmed to meet the requirement of impact strength of greater than 18 kJ/m2 and heat resistance of higher than 110° C. Further it was also confirmed to have excellent tensile property superior to those of polylactic acid composite compositions prepared by using the conventional compatibilizers, thus being able to be used for the manufacture of interior and exterior parts of a vehicle including dash outer, dash inner, door trim, package tray as well as those for construction.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene-polylactic acid composite composition comprising polypropylene resin, polylactic acid resin, ethylene-octene copolymer resin grafted by anhydrous maleic acid, polylactic acid resin grafted by anhydrous maleic acid, polyethylene-glycidyl methacrylate resin and talc particles.

2. The polypropylene-polylactic acid composite composition according to claim 1 comprising:
   55-60 wt. % of polypropylene resin;
   25-30 wt. % of polylactic acid resin;
   1-5 wt. % of ethylene-octene copolymer resin grafted by anhydrous maleic acid;
   1-5 wt. % of polylactic acid resin grafted by anhydrous maleic acid;
   1-5 wt. % of polyethylene-glycidyl methacrylate resin; and
   5-10 wt. % of talc particles.

3. The polypropylene-polylactic acid composite composition according to claim 1, wherein said polypropylene resin is selected from propylene homopolymer, propylene random copolymer and propylene block copolymer, and has an melting index of 0.5-30 g/10 min (ASTM D 1238, 230° C.).

4. The polypropylene-polylactic acid composite composition according to claim 1, wherein said polylactic acid resin is a natural material synthesized from biomass and has a molecular weight of 100,000-150,000 g/mol.

5. The polypropylene-polylactic acid composite composition according to claim 1, wherein said ethylene-octene copolymer resin grafted by anhydrous maleic acid has 0.5-1.0 wt. % of graft rate of anhyrdrous maleic acid.

6. The polypropylene-polylactic acid composite composition according to claim 1, wherein said polylactic acid resin grafted by anhydrous maleic acid has 0.3-0.5 wt. % of graft rate of anhyrdrous maleic acid.

7. The polypropylene-polylactic acid composite composition according to claim 1, wherein said polyethylene-glycidyl methacrylate resin has 5-8 wt. % of glycidyl methacrylate content.

8. The polypropylene-polylactic acid composite composition according to claim 1, wherein said talc particles are particles of hydrous magnesium silicate.

* * * * *